United States Patent Office  3,151,160
Patented Sept. 29, 1964

3,151,160
PROCESS FOR THE PREPARATION OF TERTIARY-AMINO-ALKYLATED PRIMARY AMINES
John D. Spivack, Spring Valley, N.Y., assignor to Geigy Chemical Corporation, Ardsley, N.Y., a corporation of Delaware
No Drawing. Filed Dec. 2, 1958, Ser. No. 777,587
10 Claims. (Cl. 260—570.5)

The present invention relates to a novel process for the preparation of alkylene polyamines as well as of polyalkylene polyamines. These polyamines—some of which are known and others of which are new—are characterized in that the molecule thereof comprises at least one tertiary amino group joined via an alkylene radical to at least one primary amino group. Representative of these alkylene polyamines and polyalkylene polyamines are those which may conveniently be represented by the following formula:

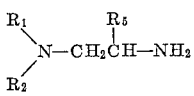

wherein each $R_1$ and $R_2$ represents an alkyl with a maximum of 18 carbon atoms, phenyl, lower aminoalkyl or polyaminoalkylaminoalkyl group, each alkyl of the latter being lower alkyl, and $R_5$ is hydrogen or a lower alkyl group (e.g. methyl, etc.).

The invention also relates to the aforesaid new compounds which, more particularly characterized, are substituted dialkylenetriamines in which the bridge nitrogen atom carries a higher alkyl group as substituent, the two primary amino groups remaining unsubstituted. These new bridge-nitrogen substituted dialkylenetriamines may be represented by the following formula:

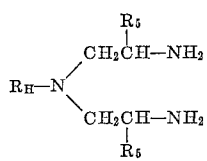

wherein $R_H$ is a higher alkyl group, i.e. one containing 6 to 18 carbon atoms, and preferably 8 to 12 carbon atoms, and $R_5$ has the precedingly-recited significances.

Prior to the present invention, the two most commonly and generally employed methods for preparing polyamines having at least one tertiary amino group and a primary amino group separated from each other by an alkylene radical were:

(i) Alkylation of a secondary amine;
(ii) Gabriel's synthesis using potassium phthalimide.

The alkylation reaction is outlined in the following equation:

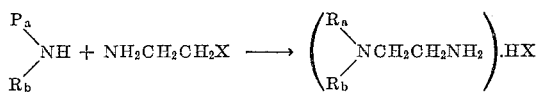

where X is a halogen atom or an $OSO_3H$ group.

In order to minimize the extent to which undesired further alkylation occurs on the product, a very large excess of reactant amine

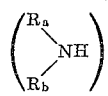

is employed. Thus the method involves recovery losses of reactant amine. Furthermore, this method is limited to the production of only the simpler diamines, because the inherent non-selective nature of the reaction leading to more or less random substitution of other replaceable hydrogens results in a drastic reduction in yields in the case of somewhat more complex reactant amines.

The Gabriel synthesis of amines may be represented as follows:

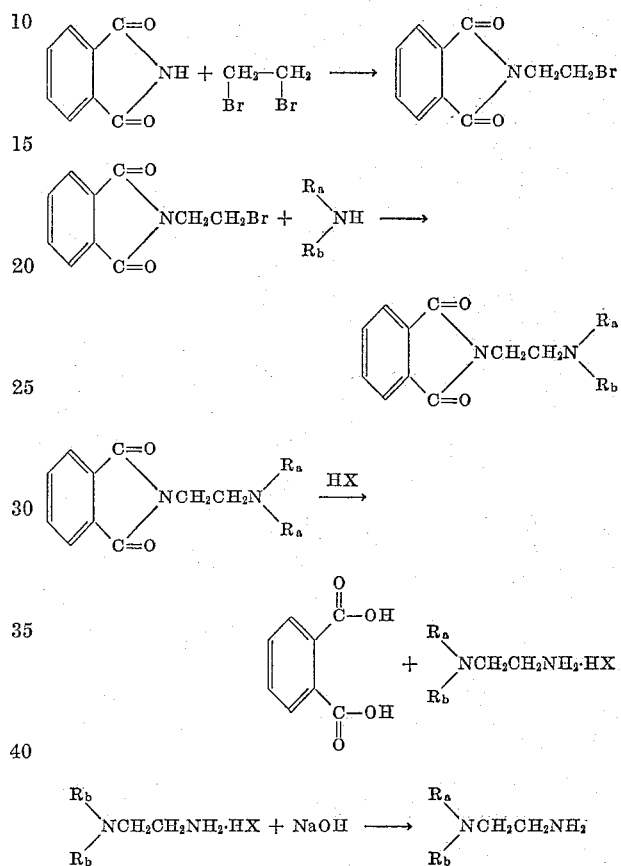

This method is not only relatively inefficient because it involves a much larger number of steps, but also because by-product reactions in each one of the steps serves to decrease very markedly the overall yield of the final amine. Further, economic considerations greatly reduce the commercial exploitation of the Gabriel synthesis of many amines because of the high cost of potassium phthalimide and the reactant bromides.

In view of this state of affairs, the embodiment of a new and practically, as well as economically, superior process for the preparation of the aforementioned type of polyamines represented a desideratum in the art. A primary object of the present invention is the satisfaction of this desideratum. A further object is, incidentally, to provide valuable new compounds, the hereinbefore-mentioned substituted dialkylenetriamines. These objects are realized by the present invention, according to which, briefly stated, an appropriate tertiary aminoalkyl primary amide—advantageously obtained by causing ammonia or a primary or secondary amine to be added across the olefinic double bond of an $\alpha,\beta$-unsaturated primary amide—is converted into the corresponding amine having one less carbon atom by treatment of the amide with an alkaline solution of halogen, e.g. of chlorine or of bromine. The effective treating agent for such conversion may conveniently take the form of an aqueous solution of an alkali metal hypohalite.

The conversion according to the instant invention may be illustrated, in one of its simplest forms, by the following:

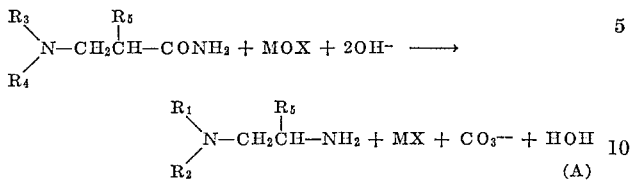

(A)

wherein $R_1$, $R_2$ and $R_5$ have the precedingly-recited significances, each of $R_3$ and $R_4$ is a member selected from the group consisting of alkyl, phenyl, carbamoylalkyl and polycarbamoylalkylaminoalkyl (all these alkyls being lower alkyls), M represents an alkali metal ion, and X represents chlorine or bromine.

The preparation of the starting amide may be illustrated as follows:

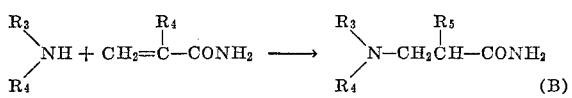

(B)

wherein $R_3$, $R_4$ and $R_5$ have the precedingly-recited significances.

Similar equations may be written in the case of the alkylene polyamines, or where the amide preparation involves the use of ammonia, such equations being more complicated in form but not in concept. For example the reactions employing ammonia and acrylamide may be represented as follows:

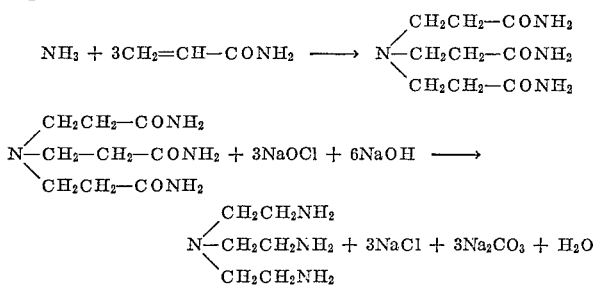

The reactions employing ethylenediamine and acrylamide may be illustrated as follows:

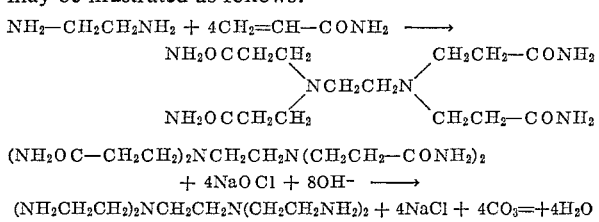

$(NH_2OC-CH_2CH_2)_2NCH_2CH_2N(CH_2CH_2-CONH_2)_2$
$+ 4NaOCl + 8OH^- \longrightarrow$
$(NH_2CH_2CH_2)_2NCH_2CH_2N(CH_2CH_2NH_2)_2 + 4NaCl + 4CO_3^{=} + 4H_2O$ Amines of the formula

which may be used in the preparation of the starting amides include, inter alia: primary saturated aliphatic amines, such as methylamine, ethylamine, propylamine, butylamine, hexylamine, octylamine, dodecylamine, octadecylamine; secondary saturated aliphatic amines, such as dimethylamine, diethylamine, dibutylamine, dihexylamine, dioctylamine, dinonylamine, didodecylamine, dioctadecylamine; unsaturated aliphatic amines, such as oleyl amine; aromatic amines, such as aniline, the ortho-, meta-, and para-isomers of chloroaniline, anisidine, phenylene-diamine, aminophenol, nitroaniline, etc. as well as the corresponding α- and β-naphthylamines and their derivatives. The alkyline polyamines are also very useful as reactants in this regard. For example, in addition to ethylenediamine, there may be employed diethylenetriamine, triethylenetetramine, tetraethylenepentamine as well as the corresponding polypropylene amines.

Acrylamide and methacrylamide are particularly suitable for use in the process of the invention although other α,β-unsaturated amides may also be used.

The metal hypohalites which may be used to advantage in the new process belong to the group of alkali metal and alkaline earth metal hypohalites, such as sodium hypochlorite, sodium hypobromite, potassium hypochlorite and potassium hypobromite as well as calcium hypochlorite and calcium hypobromite.

The usual alkali metal hydroxides, such as sodium and potassium hydroxide are especially useful in this reaction to provide the requisite hydroxyl ion.

In general, it is desirable that the reaction involving the conversion of $-CONH_2$ to $-NH_2$ be carried out in alkaline hydroxylic solvents. From the viewpoint of convenience, it is preferred that this reaction be carried out in water. Moreover, it is particularly advantageous to keep the reaction temperature during hypohalite addition below 30° C. and preferably below 15° C., in order to avoid undesired side reactions. It is of course undesirable for the principal reaction, i.e. the conversion of the amide to the desired amine, be accompanied by undesired side reactions involving e.g. saponification, haloamine formation, or oxidation of the tertiary amine group also present.

The conversion from $-CONH_2$ to $-NH_2$ may also be effected under anhydrous conditions, e.g. in methanol, using molecular halogen, such as bromine, and methoxide ion as base. Here too undesired side reactions may be avoided by temperature control.

In general, the molar proportions used to advantage in the process of the invention are essentially the stoichiometric proportions hereinbefore indicated illustratively in Equations A and B. If less than the stoichiometric proportion of hypohalite is used, then the formation of acylurea

may take place to an undesirable extent. More than a modest excess of hypohalite may lead to undesired side reactions. It is advantageous to use an excess of hydroxide of about one mole per $-CONH_2$ group in order to accelerate the reaction, i.e. to achieve a so-called "mass action" effect. It has also been found useful in insuring good yields and temperature control that effective agitation be applied. This is particularly important in cases where the tertiary aminoalkyl amides are reacted in the form of liquid dispersions.

In many specific instances, the reactions described hereinbefore, i.e. the conversion of the amides into the desired amines and the preceding preparation of the amides, can be carried out as one continuous operation without the isolation of the intermediate amides, since the latter are formed practically quantitatively and can be used in the same equipment without isolation or purification. This mode of operation is, for example, particularly advantageous in the preparation of N,N-diethylethylenediamine and N″-methyl diethylenetriamine. The N″ designation is conventional for referring to the bridge nitrogen, so that the last mentioned compound corresponds to the formula

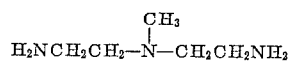

The N″ type of designation is in accord with the practice set forth in Chemical Abstracts, Subject Index, Decennial for 1937–46 (cf. for instance "N″-ethyldiethylenetriamine"); the more recent nomenclature replaces the N″ by a numeral, as evidenced by the Decennial Subject Index for 1947–1956 (cf. for instance "4-ethyl-diethylenetriamine").

The amines of the present invention are useful as chelating agents for metals such as zinc, copper, nickel, cadmium and silver. Thus compounds having the structures (I) and (II):

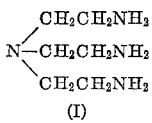
(I)

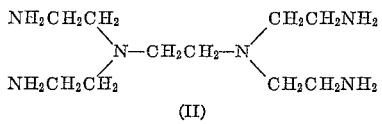
(II)

are described as particularly effective complexing agents in "Complexometric Titrations" by G. Schwarzenbach (Interscience Publishers, 1957, New York).

Schiff bases made from salicylaldehyde and polyamines, such as can be prepared by the process of the present invention, are effective as metal deactivators in hydrocarbon systems; e.g. the addition of such Schiff bases e.g. to gasoline incorporates into the latter a deactivator-antioxidant effective against metals such as iron, copper, iron-containing alloys and copper-containing alloys with which the gasoline may come into contact.

The amines of the present invention are also useful as intermediates and as complexing agents. For example, N,N-dimethyl- and N,N-diethyl-ethylenediamines find utility as intermediates in the manufacture of pharmaceuticals.

The new higher alkylamines provided by the present invention (e.g. the compounds where $R_H$ is a dodecyl group or a 2-ethylhexyl group, and especially 4-dodecyl diethylenetriamine) are corrosion inhibitors for ferrous metals in acidic aqueous media.

The invention is further set forth with reference to the following presently-preferred representative exemplary embodiments. In the examples, parts are by weight unless otherwise indicated. The relationship of parts by weight to parts by volume is the same as that between grams and milliliters. Temperatures are in degrees centigrade.

*Example 1*

60 parts of sodium hydroxide (1.50 moles) are dissolved in 250 parts of water and cooled to 10°. 72 parts of N,N-diethyl-aminopropionamide (0.5 mole) are added to the aqueous sodium hydroxide solution and the milky dispersion cooled to 10°. 304 parts by volume of aqueous sodium hypochlorite (3.44 N; 0.50 mole NaOCl) are added dropwise over a period of one hour, the reaction mixture being maintained at 10 to 12° by means of an ice-water bath. The reaction mixture is allowed to warm up to room temperature (about 20–30°) whereupon an exothermic reaction takes place, the temperature rising to 53°, the solution changing in color from almost colorless to yellowish orange. The reaction mixture is distilled at atmospheric pressure, 210 parts by volume of distillate being collected. 75 parts of sodium hydroxide are added to this distillate, whereupon a yellow oil separates (47.5 parts) consisting of over 90 percent N,N-diethylethylenediamine. The N,N-diethylethylenediamine is redistilled over sodium at 139 to 146° at atmospheric pressure yielding 44 parts of colorless liquid (or 76 percent of theory).

*Analysis.*—Basic nitrogen equivalent weight: Calculated for $C_6H_{16}N_2$—58. Found—59.3.

The N,N-diethylaminopropionamide, used in the preceding portion of this example, is advantageously prepared as follows:

292 parts of diethylamine (4.0 moles) are added dropwise at 10 to 15° with stirring to an aqueous solution of 284 parts of acrylamide (4.0 moles) and 200 parts of water over a period of 30 minutes. The reaction mixture is then warmed at 45 to 55° for two hours and the water removed by distilling in vacuum. The so-obtained N,N-diethylaminopropionamide distils at 126 to 130° at 0.9 to 1.25 mm. Hg pressure yielding 535 parts of a colorless viscous oil (about 93 percent of theory).

It will be understood that it is not necessary to isolate the N,N-diethylaminopropionamide and that the conversion into the N,N-diethylenediamine may be carried out mutatis mutandis as a part of a continuous process.

N,N-diethylethylenediamine has heretofore been prepared, e.g. via the β-aminoethyl hydrogen sulfate; however, the procedure is much more involved than that according to the present invention, and a much lower yield is obtained, as is evident from the following description of the known process:

147 parts of β-aminoethyl hydrogen sulfate (96%; 0.99 mole) together with 508 parts of water and 223 parts of diethylamine (98%; 3.0 moles) are charged into a stainless steel autoclave and heated with shaking at 160–165° and at reaction pressures in the range of 190 to 210 pounds per square inch. The contents of the autoclave are poured into a large separatory funnel, the orange reaction solution being treated with 240 parts of 50% aqueous sodium hydroxide and allowed to separate. The upper phase (448 parts) is distilled yielding the following fractions:

| | Temp., ° C. | Weight (parts) | Product |
|---|---|---|---|
| (1) | 75–78 | 230 | 75.8% $(C_2H_5)_2NH$. |
| (2) | 95–103 | 225 | Aqueous solution of N,N-diethylethylenediamine. |

180 parts of sodium hydroxide is cautiously dissolved in fraction (2) with cooling causing the separation of a light green-colored amine layer. The amine phase is distilled, and the portion boiling at 141–150° (35.6 parts) is collected. The yield of N,N-diethylethylenediamine is about 30 percent of theory.

*Example 2*

48 parts of sodium hydroxide are dissolved in 125 parts by volume of water and cooled to 10°. 31.8 parts of methylimino-bis-propionamide (0.184 mole) are added to the stirred cold aqueous alkali solution keeping the temperature at 10° or less. 210 parts by volume of aqueous sodium hypochlorite (3.89 N; 0.40 mole) are added dropwise over a period of 30 minutes, stirring at 10 to 12° being continued for 1 hour after addition is complete. The reaction mixture is then warmed to 30°, whereupon an exothermic reaction ensues raising the temperature to 60°. The reaction mixture is heated at 85 to 90° with stirring for two hours. Analysis of the reaction mixture indicates that the desired amine is formed to the extent of 90 percent of theory.

140 parts of sodium hydroxide are dissolved in 390 parts by volume of the above reaction mixture, the precipitated inorganic solids being filtered off by suction. The filtrate is extracted with about 300 parts by volume of isopropanol, the isopropanol being removed by distillation at atmospheric pressure through a fractionating column. The residue is distilled under vacuum yielding 11.5 parts of a colorless oil boiling at 93° at 25 mm. Hg pressure. The distilled 4-methyl diethylenetriamine is thus isolated in 54 percent of theory. The so-obtained 4-methyl diethylenetriamine boils at 87 to 89° at 17 to 18 mm. Hg pressure.

*Analysis.*—Basic nitrogen equivalent weight: Calculated for $C_5H_{15}N_3$—39.0. Found—39.7. Nitrogen (Dumas) percent: Calculated—35.9. Found—36.0.

The methylimino-bis-propionamide, used in the preceding portion of this example, is advantageously prepared as follows:

355 parts of acrylamide (5.0 moles) are dissolved in 500 parts by volume of water and cooled to 10°. 152.6 parts of aqueous methylamine (40.6%; 2.0 moles) are added dropwise over a period of one hour, the temperature of the reaction mixture being kept below a maximum of 41° by cooling in an ice-water bath. The reaction solution is heated at 85 to 90° for 6 hours and concentrated to a pale yellow viscous syrup at 10 to 15 mm. Hg pressure. Analysis of the reaction solution at the end of the heating period indicates 100% reaction. The viscous syrup is triturated with 750 parts by volume of methanol and crystallizes spontaneously. The first crop of crystals are filtered (177 parts) and the filtrate is concentrated by removal of methanol by distillation. 250 parts by volume of isopropanol are added and an additional 102 parts of product are obtained. Total yield is 81 percent of theory. The crystals melt at 109 to 110° C. and upon recrystallization from methanol melt at 111–112° C. after drying.

*Analysis.*—Basic nitrogen equivalent weight: Calculated for $C_7H_{15}N_3O_2$—173. Found—177.

If, in the foregoing, 425 parts of methacrylamide are used instead of 355 parts of acrylamide, while otherwise proceeding as precedingly described in this example, the final product 4-methyl 2,2'-dimethyl-diethylenetriamine

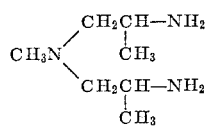

is obtained, the properties of which are essentially similar to those of the 4-methyl diethylenetriamine. In this case, the intermediate amide

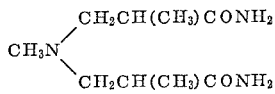

is first formed.

Example 3

72 parts of sodium hydroxide (1.8 moles) are dissolved in 405 parts by volume of aqueous sodium hypochlorite (0.80 mole) with cooling so that the temperature of the alkaline solution never rises above 10°. To the stirred cooled alkaline hypochlorite solution at −3°, there is rapidly added dropwise, a warm solution of 46 parts of nitrilo-tris-propionamide (0.30 mole) in 200 parts by volume of water so that the temperature during addition is in the range 5 to 10°. The reaction mixture is then warmed to 40° whereupon an exothermic reaction ensues changing the color of the solution from pale yellow to orange and raising the temperature to about 70°. The reaction mixture is heated for 2½ hours at 90 to 95°. The reaction mixture is then cooled to about 40° and made acid to Congo red by the cautious addition of concentrated hydrochloric acid. The reaction mixture is concentrated to about 150 parts by volume and made alkaline (pH 13 to 13.5) and concentrated to dryness. The residue is extracted with successive 100 parts by volume portions of methanol. The residue from methanol upon distillation yields 16.5 parts of tris(2-aminoethyl)amine boiling at 103° C. at 1.0 mm. Hg pressure, a yield of 56.5% of theory. Upon redistillation, the obtained N,N,N-tris(2-aminoethyl)amine boils at 96–99° C. at 0.80 mm. Hg pressure.

*Analysis.*—Basic nitrogen equivalent weight: Calculated for $C_6H_{18}N_4$—48.7. Found—49.7.

The nitrilo-tris-propionamide, used in the preceding portion of this example, is advantageously prepared as follows:

5350 parts of a 40 percent aqueous acrylamide solution containing 2130 parts of acrylamide (30 moles) is mixed with 2500 parts of concentrated ammonium hydroxide (28% $NH_3$; 41.1 moles) and allowed to stand at room temperature for 20 hours. The solution is concentrated in stages to one-third volume at reduced pressures, the precipitated solids being filtered off, and the filtrate being returned to the still pot for further concentration. The combined white crystals are dried in a vacuum oven at 80° and 100 mm. Hg pressure; they melt at 182–183°. The yield is 1662 parts or 72 percent of theory of nitrilo-tris-propionamide.

*Analysis.*—Basic nitrogen equivalent weight: Calculated for $C_9H_{18}N_4O_3$—230. Found—228.

The tris(2-aminoethyl)amine can also be prepared via the β-aminoethyl phthalimide; however, the procedure is much more involved than that according to the present invention, and much lower yield is obtained as is evident from the following:

150 parts of potassium phthalimide (0.8 mole) and 450 parts of ethylene bromide are heated together at reflux (137°) for 12 hours. The reaction product is then distilled to recover 306 parts of ethylene bromide. The reaction product is heated with 300 parts by volume of ethanol and filtered. The precipitate is washed three times with 50 parts by volume of ethanol. The ethanol solution is concentrated to dryness and the residue dissolved in carbon disulfide. The product from carbon disulfide melts at 80° and weighs 130 parts. The yield of β-bromoethylphthalimide is 64% of theory.

50 parts of the so-obtained β-bromoethylphthalimide (0.20 mole) is heated at 148 to 153° for about 8 hours, anhydrous ammonia being bubbled through the melted phthalimide. The product is then taken up in 100 parts by volume of ethyl alcohol, the insoluble material being filtered off. The insoluble precipitate is washed with 100 parts by volume of ethanol once again, yielding 10 parts of N,N,N-(triphthalimidoethyl)amine melting at 191°. This product is heated at gentle reflux with 200 parts by volume of 6 N hydrochloric acid. The insoluble material is filtered off and removed. The aqueous solution is evaporated to dryness, washed with methanol yielding 3.5 parts of N,N,N-tris(2-aminoethyl)amine in the form of trihydrochloride. The yield is 7% of theory for the second step, giving an overall yield of 4.5% of theory.

Example 4

96 parts of sodium hydroxide pellets are dissolved in 600 parts by volume of aqueous sodium hypochlorite (4.0 normal; 1.20 moles), the temperature being kept below 10° by external cooling. To the stirred cooled aqueous alkali hypochlorite at −16° are added 68.8 parts of ethylenediaminetetrapropionamide (0.20 mole) dissolved in 150 parts by volume of warm water over a period of 20 minutes so that the reaction temperature is kept at −5 to 0°. The reaction mixture is allowed to warm up to 15° over a period of 45 minutes. The reaction mixture is then warmed to 40° whereupon an exothermic reaction ensues which results in a maximum temperature of about 72° being attained, the reaction solution becoming orange in color. To the reaction mixture are added 63 parts of sodium sulfite (0.5 mole) and the reaction mixture is heated at 95° for 2½ hours. The reaction mixture is then cooled and cautiously made acid to Congo red with concentrated hydrochloric acid. The acid solution is concentrated to about 100 parts by volume by distillation at atmospheric pressure, the concentrate then being made alkaline (pH 13–13.5) with 50 percent aqueous sodium hydroxide. The methanol is removed by distillation and the residue obtained purified further by treatment with 400 parts by volume of 30 percent aqueous sodium hydroxide. The separated oil is distilled over potassium hydroxide pellets and boils at 195° at 1.2 to 1.5 mm. Hg pressure, yielding 20.2 parts of N,N,N',N'-tetrakis (2-aminoethyl)ethylenediamine. The yield is 43.5% of theory.

The ethylenediaminetetrapropionamide, used in the preceding portion of this example, is advantageously prepared as follows:

616 parts of ethylenediamine (85.6%; 8.8 moles) are added dropwise over a period of 45 minutes to a stirred solution of 2982 parts of acrylamide (42 moles) dissolved in 4700 parts by volume of water, the maximum temperature being kept at 40° by cooling with a water bath. The reaction mixture is then heated at 85 to 90° for four hours and then concentrated by distillation at 15 mm. Hg pressure until white crystals appear in the still pot. The still liquors are allowed to crystallize spontaneously, the crystal slurry being diluted with an equal volume of methanol and filtered by suction. The yield is 2714 parts (or 91% of theory) of N,N,N',N'-tetrakis(2-carbamoylethyl)ethylenediamine (ethylenediaminetetrapropionamide) melting at 171–172°.

*Analysis.*—Nitrogen (Dumas) percent: Calculated for $C_{14}H_{28}N_6O_4$—24.42. Found—24.02.

Example 5

80 parts of sodium hydroxide (2.0 moles) are dissolved in 310 parts by volume of aqueous sodium hypochlorite and cooled to 20°. The alkaline hypochlorite is added dropwise at 5 to 15° over a period of 30 minutes to a solution of 68 parts of 2-ethylhexylimino-bis-propionamide (93.3%; 0.23 mole) in 200 parts of water. The reaction mixture is then stirred for 1 hour at room temperature followed by 2 hours at 80°.

500 parts of potassium hydroxide pellets are added with cooling, followed by 300 parts of water so that an oily layer separates. The separated oil is taken up in isopropanol, filtered by suction and freed of isopropanol by distillation at 15 mm. Hg pressure. The residue is distilled at 120 to 140° at 0.5 to 1 mm. Hg pressure, the distillate so obtained being then redistilled at 89 to 90° at 0.15 to 0.20 mm. Hg pressure. The product is the desired N''-2-ethylhexyl diethylenetriamine.

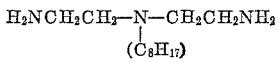

*Analysis.*—Nitrogen (Dumas) percent: Calculated for $C_{12}H_{29}N_3$—19.53. Found—18.66.

The 2-ethylhexylimino-bis-propionamide, used in the preceding portion of this example, is advantageously prepared as follows:

130 parts of 2-ethylhexylamine are added dropwise over a period of about 20 minutes at 10° to a solution of 166.5 parts of acrylamide (2.3 moles) in 500 parts by volume of ethanol. The reaction mixture is then heated with stirring at 85–90° for 6 hours and then concentrated by distilling the ethanol at 15 mm. Hg pressure. The residual light yellow oil is dissolved in ether, freed of precipitated excess acrylamide by suction filtration, the ether being removed by distillation at atmospheric pressure and finally at 1.5 mm. Hg. pressure. Analysis of the light yellow oil indicates that it is 93.3% 2-ethylhexylimino-bis-propionamide.

Example 6

80 parts of sodium hydroxide (2.0 moles) are dissolved in 260 parts by volume of aqueous sodium hypochlorite (4.03 N) and cooled to 5 to 10° by the addition of about 60 parts of ice. The alkaline hypochlorite so obtained is added dropwise over a period of 30 minutes with stirring at a temperature of 10 to 15° to a solution of n-dodecylimino-bis-propionamide in 200 parts of water. The mixture is then heated with stirring at 80° for two hours, accompanied by considerable foaming. 350 parts of potassium hydroxide are dissolved in the reaction mixture with warming, whereupon a yellow oil separates. The separated oil is dissolved in about 300 parts by volume of isopropanol. The isopropanol is recovered by distillation at 15 mm. Hg pressure and the residue distilled yielding 35 parts of product boiling at 160° C. at 0.4 mm. Hg pressure. The yield is 52 percent of theory. The so-obtained 4-n-dodecylimino-bis-(2-ethylamine) is redistilled at 140°, at 0.2 mm. Hg pressure.

*Analysis.*—Nitrogen (Dumas) percent: Calculated for $C_{16}H_{37}N_3$—15.49. Found—14.64.

The n-dodecylimino-bis-propionamide, used in the preceding portion of this example, is advantageously prepared as follows:

185 parts of n-dodecylamine (1.0 mole), dissolved in 70 parts of methanol, are added dropwise at 9 to 11° to a solution of 166 parts of acrylamide (2.3 moles) in 500 parts of methanol with stirring. The reaction mixture is heated at 65° with stirring for an additional 6 hours. An additional 100 parts by volume of methanol are added and the reaction mixture allowed to crystallize spontaneously. The white crystals are filtered off, dried in vacuum at 100 mm. Hg pressure at 60°, weighing 274.5 parts representing a yield of 81.5%. The white crystals melt at 116 to 117°.

*Analysis.*—Nitrogen (Dumas) percent: Calculated for $C_{18}H_{27}N_3O_2$—12.84. Found—12.41. Basic nitrogen equivalent weight: Calculated—327. Found—327.

Example 7

96 parts of sodium hydroxide are dissolved in 500 parts by volume of sodium hypochlorite (4.0 N, 1.0 mole) the temperature being kept below 10° by external cooling. To the stirred alkaline hypochlorite at −10° are added 94 parts of anilino-bis-propionamide (0.4 mole) dissolved in 450 parts by volume of warm water over a period of 30 minutes, so that temperature remains in the range of −7° to −3°. The greenish blue reaction mixture is stirred at 0 to 10° for 1 hour and then warmed to 30°, whereupon an exothermic reaction ensues which results in a maximum temperature of 70° being reached, the color changing to reddish brown. The reaction solution is heated at 93 to 95° for four hours, during which the solution becomes turbid and a dark brown organic upper layer separates when stirring is stopped. The upper layer is freed of salt by solution in 100 parts by volume of isopropanol and separation of the precipitated solids by filtration. The residue from isopropanol yields 49.8 parts of 4-phenyldiethylene-triamine boiling at 148–155° at 1 mm. Hg pressure. The yield is 69.5 percent of theory.

The anilino-bis-propionamide, used in the preceding portion of this example, is advantageously prepared as follows:

93 parts of aniline are dissolved in 150 parts by volume of glacial acetic acid, the solution being heated to about 85°. 158 parts of acrylamide are added to the acetic acid solution over a period of 45 minutes; the addition reaction is exothermic and is held to a maximum temperature of 120° by removing the heat source and controlling the rate of addition. After the addition is complete, the reaction mixture is heated at 80 to 82° for about 6 hours. The reaction mixture is diluted with 250 parts of water and made alkaline with aqueous sodium hydroxide. The resulting tan precipitate is filtered off and dried; it consists of 198 parts of anilino-bis-propionamide of about 95% purity, representing a yield of 80% of theory.

Upon recrystallization from dioxane the anilino-bis-propionamide is obtained as white crystals, melting at 152° after drying.

*Analysis.*—Nitrogen (Dumas) percent: Calculated for $C_{12}H_{17}N_3O_2$—17.87. Found—17.64.

Having thus disclosed the invention, what is claimed is:

1. In a process for the manufacture of a polyamine of the formula

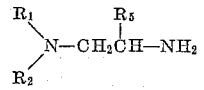

wherein each of $R_1$ and $R_2$ represents a member selected from the group consisting of alkyl with 1 to 18 carbon atoms, phenyl, amino(lower)alkyl and polyaminoalkyl-aminoalkyl, the alkyls of the latter being lower alkyl, and $R_5$ stands for a member selected from the group consisting of hydrogen and lower alkyl, the steps of substantially uniformly intermixing (a) an amide of the formula

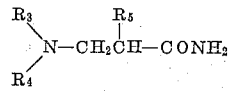

wherein $R_5$ is as precedingly described, and each of $R_3$ and $R_4$ is a member selected from the group consisting of alkyl, phenyl, carbamoylalkyl and polycarbamoylalkyl, the alkyl being lower alkyl throughout, with (b) an aqueous solution of a salt selected from the group consisting of alkali metal salts of hypochlorous acid, alkali metal salts of hypobromous acid, alkaline earth metal salts of hypochlorous acid, and alkaline earth metal salts of hypobromous acid by stirring a single one of (a) and (b) into the other one of (a) and (b) while correlating the temperature of admixing to the order of admixing, the said amide being added to the aqueous salt solution at a temperature in the range of from about —7° C. to about 10° C., the said aqueous solution being added to the said amide at a temperature within the range of from about 5° C. to about 30° C., in the presence in the reaction mixture of a molar excess, relative to the said salt, of alkali metal hydroxide selected from the group consisting of sodium hydroxide and potassium hydroxide, the molar ratio of alkali metal hydroxide to said salt being about 2:1 to about 4:1 and the molar ratio of amide to said salt being about 1:1 to about 3:1, thereafter raising the temperature of the reaction mixture until an exothermic reaction takes place, then heating the mixture to above 90° C. and up to distilling temperature, and subsequently recovering the formed tertiary amine.

2. In a process for the manufacture of a polyamine of the formula

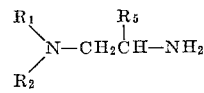

wherein each of $R_1$ and $R_2$ represents a member selected from the group consisting of alkyl with 1 to 18 carbon atoms, phenyl, amino(lower)alkyl and polyaminoalkyl-aminoalkyl, the alkyls of the latter being lower alkyl, and $R_5$ stands for a member selected from the group consisting of hydrogen and lower alkyl, the steps of gradually and substantially uniformly stirring a compound of the formula

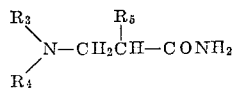

wherein $R_5$ is as precedingly described, and each of $R_3$ and $R_4$ is a member selected from the group consisting of alkyl, phenyl, carbamoylalkyl and polycarbamoylalkyl, the alkyl being lower alkyl throughout, into an aqueous solution of a salt selected from the group consisting of alkali metal salts of hypochlorous acid, alkali metal salts of hypobromous acid, alkaline earth metal salts of hypochlorous acid, and alkaline earth metal salts of hypobromous acid, while controlling the temperature of addition, said temperature being maintained within the range from about —7° C. to about 10° C. in the presence in the reaction medium to a molar excess, relative to said salt, of alkali metal hydroxide selected from the group consisting of sodium hydroxide and potassium hydroxide, the molar ratio of alkali metal hydroxide to said salt being 2:1 to about 4:1 and the molar ratio of amide to said salt being about 1:1 to about 3:1, thereafter raising the temperature of the reaction mixture until an exothermic reaction takes place, then heating the mixture to above 90° C. and up to distilling temperature, and subsequently recovering the formed tertiary amine.

3. In a process for the manufacture of a polyamine of the formula

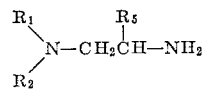

wherein each of $R_1$ and $R_2$ represents a member selected from the group consisting of alkyl with 1 to 18 carbon atoms, phenyl, amino(lower)alkyl and polyaminoalkyl-aminoalkyl, the alkyls of the latter being lower alkyl, and $R_5$ stands for a member selected from the group consisting of hydrogen and lower alkyl, the steps of gradually and substantially uniformly stirring an aqueous solution of a salt selected from the group consisting of alkali metal salts of hypochlorous acid, alkali metal salts of hypobromous acid, alkaline earth metal salts of hypochlorous acid, and alkaline earth metal salts of hypobromous acid into a solution of a compound of the formula

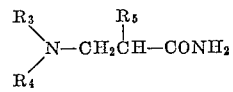

wherein $R_5$ is as precedingly described, and each of $R_3$ and $R_4$ is a member selected from the group consisting of alkyl, phenyl, carbamoylalkyl and polycarbamoylalkyl, the alkyl being lower alkyl throughout, in the presence in the reaction medium of a molar excess, relative to said salt, of alkali metal hydroxide selected from the group consisting of sodium hydroxide and potassium hydroxide while controlling the temperature of addition, said temperature being maintained within the range from about 5° C. to about 30° C., the molar ratio of alkali metal hydroxide to said salt being 2:1 to about 4:1 and the molar ratio of amide to said salt being about 1:1 to about 3:1, thereafter raising the temperature of the reaction mixture until an exothermic reaction takes place, then heating the mixture to above 90° C. and up to distilling temperature, and subsequently recovering the formed tertiary amine.

4. In a process for the manufacture of N,N-diethyl-ethylenediamine, the steps of stirring aqueous sodium hypochlorite dropwise into a solution of N,N-diethyl-aminopropionamide in a molar excess, relative to the hypochlorite, of aqueous sodium hydroxide at a temperature of 10 to 12° C., and thereafter warming the reaction mixture to about 30° C., whereupon an exothermic reaction takes place, heating the reaction mixture to distilling temperature, and subsequently recovering the formed N,N-diethylethylenediamine, the molar ratio of sodium hypochlorite to N,N-diethyl-aminopropionamide to sodium hydroxide being about 0.5:0.5:1.5.

5. In a process for the manufacture of 4-methyl-diethylenetriamine, the steps of gradually and substantially uniformly stirring aqueous sodium hypochlorite dropwise into a solution of methylimino-bis-propionamide in a molar excess, relative to the hypochlorite, of aqueous sodium hydroxide at a temperature of 10 to 12° C., and thereafter warming the stirred reaction mixture to about 30° C., whereupon an exothermic reaction takes place, heating the reaction mixture to 85–90° C., for two hours, and subsequently recovering the formed 4-methyl diethylenetriamine, the molar ratio of sodium hypochlorite to methylimino-bis-propionamide to sodium hydroxide being about 0.4:0.184:1.2.

6. In a process for the manufacture of N,N,N-tris(2-aminoethyl)amine, the steps of gradually and substantially uniformly stirring an aqueous solution of nitrilo-tris-propionamide dropwise into a solution of sodium hydroxide in aqueous sodium hypochlorite at a temperature of 5 to 10° C., the sodium hydroxide being in molar excess relative to the hypochlorite, and thereafter warming the reaction mixture to about 40° C., whereupon an exothermic reaction takes place, heating the reaction mixture to 90–95° C., and subsequently recovering the formed N,N,N-tris(2-aminoethyl)amine, the molar ratio of sodium hypochlorite to nitrilo-tri-propionamide to sodium hydroxide being about 0.8:0.3:1.8.

7. In a process for the manufacture of N,N,N',N'-tetrakis(2-aminoethyl)ethylenediamine, the steps of gradually and substantially uniformly stirring an aqueous solution of ethylenediaminetetrapropionamide into a solution of sodium hydroxide in aqueous sodium hypochlorite at a temperature of —5 to 0° C., the sodium hydroxide being in molar excess relative to the hypochlorite, and thereafter warming the reaction mixture to about 40° C., whereupon an exothermic reaction takes place, heating the reaction mixture to 95° C. for 2½ hours, and subsequently recovering the formed N,N,N',N'-tetrakis(2-aminoethyl) ethylenediamine, the molar ratio of sodium hypochlorite to ethylenediaminetetrapropionamide to sodium hydroxide being about 1.2:0.2:2.4.

8. In a process for the manufacture of 4-(2-ethylhexyl)-diethylenetriamine, the steps of gradually and substantially uniformly stirring a solution of sodium hydroxide in aqueous sodium hypochlorite dropwise into an aqueous solution of 2-ethylhexylimino-bis-propionamide at a temperature of 5 to 15° C., the sodium hydroxide being in molar excess relative to the hypochlorite, and thereafter warming the stirred reaction mixture to about 30° C. for one hour and then to 80° C. for two hours, and subsequently recovering the formed N"-2-ethylhexyl diethylenetriamine, the molar ratio of sodium hypochlorite to 2-ethylhexylimino-bis-propionamide to sodium hydroxide being about 0.23:0.23:2.0.

9. In a process for the manufacture of 4-n-dodecyldiethylenetriamine, the steps of gradually and substantially uniformly stirring a solution of sodium hydroxide in aqueous sodium hypochlorite dropwise into an aqueous solution of n-dodecylimino-bis-propionamide at a temperature of 10 to 15° C., the sodium hydroxide being in molar excess relative to the hypochlorite, and thereafter heating the stirred reaction mixture to 80° C. for about two hours, and subsequently recovering the formed 4-n-dodecyl-diethylenetriamine, the molar ratio of sodium hypochlorite to n - dodecylimino - bis - propionamide being about 0.5:0.5:2.0.

10. In a process for the manufacture of 4-phenyl-diethylene-triamine, the steps of gradually and substantially uniformly stirring an aqueous solution of anilino-bis-propionamide into a solution of sodium hydroxide in aqueous sodium hypochlorite at a temperature of −7° to −3° C., the sodium hydroxide being in molar excess relative to the hypochlorite, and thereafter warming the stirred reaction mixture to about 30° C., whereupon an exothermic reaction takes place, then heating the reaction mixture to 93–95° C., for four hours, and subsequently recovering the formed 4-phenyl-diethylene-triamine, the molar ratio of sodium hypochlorite to anilino-bis-propionamide to sodium hydroxide being 1.0:0.4:2.4.

References Cited in the file of this patent
UNITED STATES PATENTS

| | | |
|---|---|---|
| 2,267,205 | Kyrides | Dec. 23, 1941 |
| 2,681,935 | Thompson | June 22, 1954 |

OTHER REFERENCES

Theilheimer: Synthetic Methods of Organic Chemistry, vol. 10, 1956, pp. 406–407.

Noller: Chemistry of Organic Compounds, 1951, pp. 226 and 242.

Oliveto et al.: "Organic Syntheses," vol. 31, pp. 17–18, 1953.

Hutchinson et al.: J. Am. Chem. Soc., vol. 67, pp. 1966–8, 1945.

Wallis et al.: Organic Reactions, vol. III, pp. 280–282, 1947.

UNITED STATES PATENT OFFICE
CERTIFICATE OF CORRECTION

Patent No. 3,151,160                                           September 29, 1964

John D. Spivack

It is hereby certified that error appears in the above numbered patent requiring correction and that the said Letters Patent should read as corrected below.

Column 1, lines 59 to 63, the left-hand portion of the formula reading:

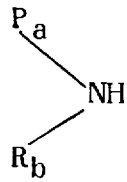      read      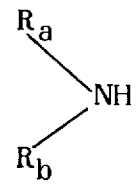

column 2, lines 25 to 32, the right-hand portion of the formula reading:

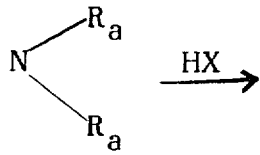      read      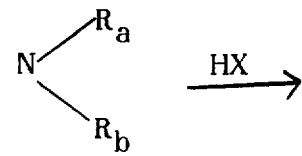

same column 2, lines 40 to 45, the left-hand portion of the formula reading:

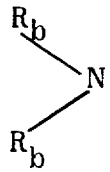      read      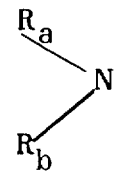

column 3, lines 20 to 24, in the left-hand side of the formula, for that portion reading:

      read      

Signed and sealed this 16th day of March 1965.

(SEAL)
Attest:
ERNEST W. SWIDER                                   EDWARD J. BRENNER
Attesting Officer                                  Commissioner of Patents